United States Patent [19]

Taylor et al.

[11] 4,033,289

[45] July 5, 1977

[54] FLUID FLOW DISTRIBUTION DEVICE AND STRIP OILER SYSTEM UTILIZING THE SAME

[75] Inventors: Herbert E. Taylor, Longmeadow, Mass.; Frederick P. Evans, Bloomfield, Conn.

[73] Assignee: P/A Industries, Inc., Bloomfield, Conn.

[22] Filed: Sept. 29, 1975

[21] Appl. No.: 617,634

[52] U.S. Cl. .............................. 118/227; 118/260; 137/453; 184/7 R; 184/65; 184/101; 251/DIG. 3

[51] Int. Cl.² ..................... B05C 1/08; F16N 25/04

[58] Field of Search .......... 184/101, 17, 6.14, 7 R, 184/7 A, 7 C, 7 CR, 7 D, 7 E, 7 F, 8, 12, 15 R, 15 B, 16, 23, 61, 66, 80, 83, 102, 103 R; 137/535, 537, 453, 592; 251/DIG. 3; 118/259, 258, 260, 227, 228; 164/149; 29/DIG. 63; 101/367, 331

[56] References Cited

UNITED STATES PATENTS

| 270,626 | 1/1883 | Bowen | 184/65 |
|---|---|---|---|
| 547,952 | 10/1895 | Hayes | 184/101 X |
| 936,472 | 10/1909 | Pfanhauser | 118/259 X |
| 1,680,711 | 8/1928 | Weston et al. | 118/260 X |
| 2,083,042 | 6/1937 | Storck | 118/260 X |
| 2,510,256 | 6/1950 | Robinson et al. | 118/260 |

FOREIGN PATENTS OR APPLICATIONS

| 32,713 | 10/1927 | France | 184/7 CR |
|---|---|---|---|
| 711,693 | 6/1932 | France | 251/DIG. 3 |
| 191,696 | 11/1907 | Germany | 184/58 |
| 123,336 | 11/1948 | Sweden | 137/453 |
| 153,362 | 2/1956 | Sweden | 251/DIG. 3 |
| 3,541 | 2/1913 | United Kingdom | 137/453 |
| 15,970 | 7/1914 | United Kingdom | 251/DIG. 3 |
| 1,217,538 | 12/1970 | United Kingdom | 251/DIG. 3 |

*Primary Examiner* — Richard C. Pinkham
*Assistant Examiner* — Arnold W. Kramer
*Attorney, Agent, or Firm* — McCormick, Paulding & Huber

[57] ABSTRACT

A strip of sheet metal moves horizontally between upper and lower felt rollers, turning them in opposite directions so that the lower roller continuously picks up oil from an oil bath. Oil is dripped down onto the upper roller from a device which is continuously provided with oil from a reservoir. The distribution device provides for an excess of oil to be bypassed and deposited into the oil bath below, and the level of the oil in the bath is used to control the flow of oil to the distribution device. The device comprises a tension spring so supported above the upper roll that oil from the reservoir flows into one end, and depending upon the spacing between the spring convolutions, a portion flows out through these convolutions, and the remainder is bypassed through the other end into the oil bath. A uniform distribution of oil along the axial extent of the upper roller is made possible by the spring type distribution device.

12 Claims, 2 Drawing Figures

U.S. Patent   July 5, 1977   4,033,289
FIG. 1
FIG. 2
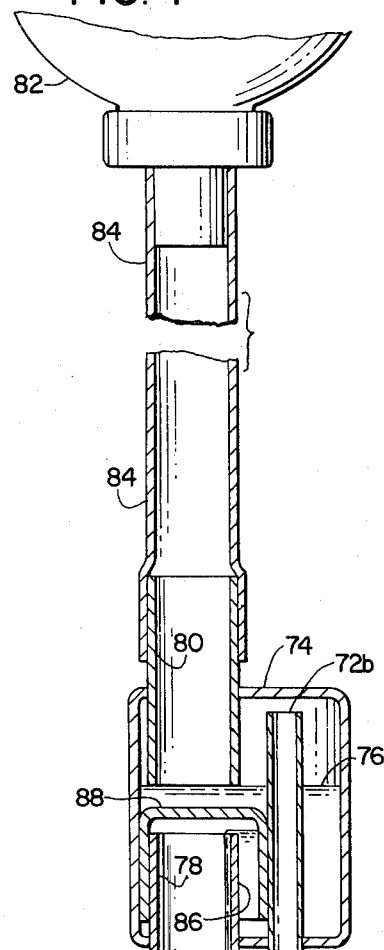
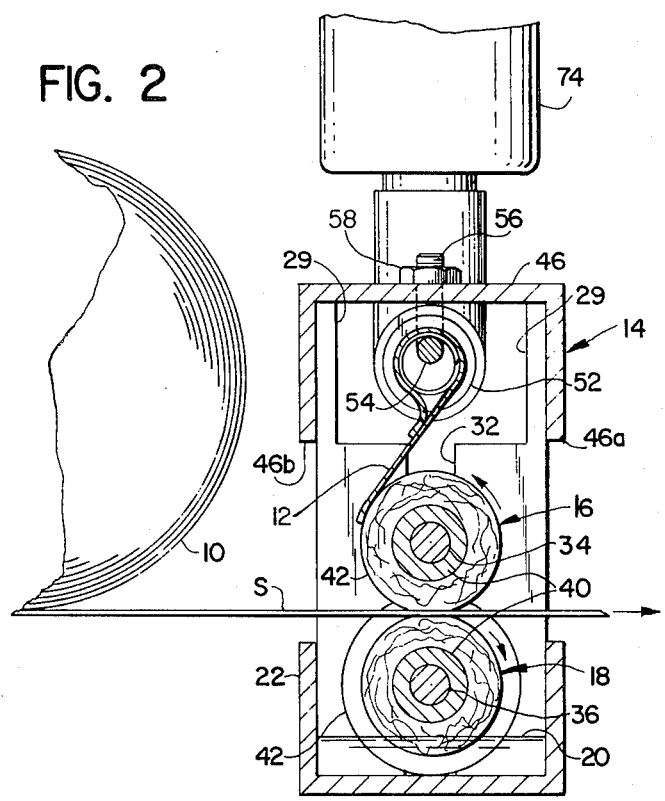
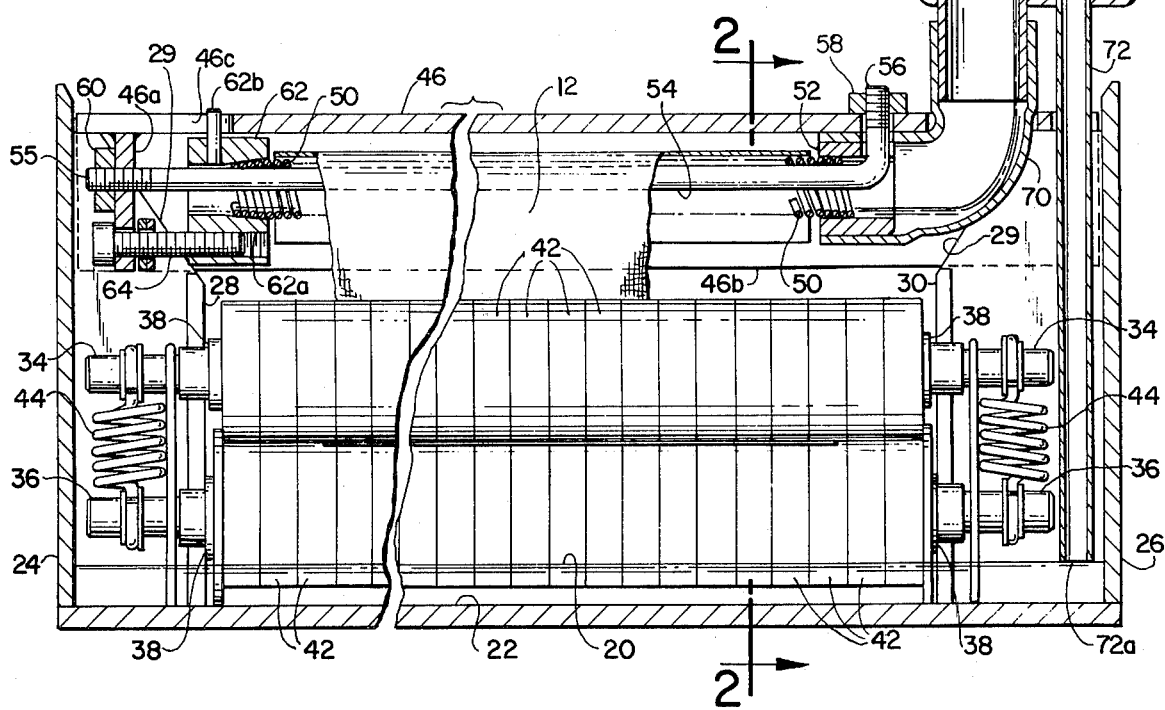

FLUID FLOW DISTRIBUTION DEVICE AND STRIP OILER SYSTEM UTILIZING THE SAME

SUMMARY OF THE INVENTION

This invention relates generally to strip oiling systems for lubricating strip material prior to feeding of the material into a machine tool or the like, and deals more particularly with such a system wherein a distribution device is provided for distributing oil longitudinally of upper and lower rollers adapted to be turned as a result of the strip material being fed therebetween.

The general object of the present invention is to provide a strip oiling system capable of depositing films of oil on both the upper and lower surfaces of a continuously moving strip of metal or the like. Such a strip must be so lubricated prior to undergoing the forming process in most types of machine tools for forming articles from said strip material.

A more specific object of the present invention is to provide a device for distributing oil uniformly along the axis of an upper roller of such a system, and to thereby provide a uniform film of oil on the upper surface of the strip.

These objects, and others which will be apparent to those skilled in the art, are achieved in the system disclosed herein. In its presently preferred form the system comprises a continuous flow system which may be vacuum controlled to maintain a predetermined level of oil in an oil bath associated with a bottom roller, which serves to apply a uniform film of oil to the underside of the strip. The moving strip rotates the bottom roller, and also rotates a top roller which applies a similar oil film to the strip upper surface. A novel oil distributing device in the form of a tension spring oriented parallel to and above the axis of the upper roller can be stretched slightly to meter oil downwardly between its convolutions onto the upper roller. A supply of excess oil is continuously conveyed through the spring to the oil bath associated with the lower roller. The vacuum control system includes a first control chamber having an upper region at subatmospheric pressure above the surface of the oil in the chamber. A standpipe has its upper end in communication with said upper region and its lower end is in the oil bath to define the level of oil desired to be maintained therein. Means is also provided for replenishing oil drawn from the control chamber by the distribution device, through a trap or the like, and said replenishing means preferably comprises an inverted container and an associated supply line with a second standpipe in the control chamber. Oil is continuously available to replace oil withdrawn from the control chamber, and the level of oil in the control chamber is determined by the height of the lower end of said secondary supply standpipe.

BRIEF DESCRIPTION OF THE DRAWINGS

FIG. 1 is a vertical elevational view with portions broken away illustrating an oil distributing device and associated oiler system incorporating the present invention.

FIG. 2 is a sectional view taken generally on the line 2—2 of FIG. 1 and also shows in schematic fashion the strip-like workpiece being unwound from a reel and passing through the device of the present invention prior to being fed into a machine tool or the like. DETAILED DESCRIPTION Turning now to the drawing in greater detail, FIG. 2 shows in schematic fashion a reel or coil of strip material, as indicated generally at 10, which strip material may comprise sheet metal or the like to be fabricated into articles of stamped or drawn configuration in a conventional machine tool, as indicated. In accordance with the present invention an oiler system is provided for applying a film of oil or other lubricant to both the upper and lower surfaces of the strip S as the strip is fed from the reel 10 to the machine tool.

The oiler system includes a generally open rectangular frame 14 through which the strip S of sheet metal or the like is adapted to be fed, and the motion of the strip S serves to rotate an upper roller 16 in a counterclockwise direction as indicated generally by the arrow in FIG. 2, and to rotate a lower roller 18 in the opposite direction or clockwise direction as indicated in FIG. 2. The lower roller 18 turns in an oil bath, indicated generally at 20, which oil bath serves as a sump for the excess fluid delivered to the upper roller 16 by the novel oil distribution device housed in the upper portion of the rectangular frame 14 and described in greater detail hereinbelow. The oil bath 20 is contained in a channel-shaped member 22 comprising the lower portion of the rectangular frame 14. The end walls of the sump for the oil bath 20 are defined by the vertical members 24 and 26. These vertical members 24 and 26 cooperate with channel-shaped elements 28 and 30, and more particularly with flanges thereof, said flanges being welded to the end members 24 and 26 respectively, to define an upwardly open box-like structure the inner walls of which define vertically elongated slots 32 best shown in FIG. 2 such that axle portions 34 and 36, of the upper and lower rolls 16 and 18 respectively, can be rotatably supported therein. These rollers 16 and 18 preferably include bushings 38,38 on these axles 34 and 36 such that the bushings are received in the said slots 32,32 and the axles 34 and 36 are rotatably received in these bushings.

Each of the rollers, 16 and 18, is of identical construction and includes a central core 40 attached to its associated axle, 34 and 36 respectively, and a plurality of annular pads 42,42 are mounted on the cores 40,40 to provide oil absorbent rollers such that the oil can be effectively picked-up from the sump or oil bath 20 associated with the lower roller 18 for example, and applied to the under surface of the strip S, and so that oil dripped downwardly onto the upper roller 16 can be similarly applied to the upper surface of the strip S as these rollers are rotated in response to translation of the strip.

In order to provide for sufficient frictional contact between the rollers and the strip a tension spring 44 acts between the axles 34 and 36 associated with the upper and lower rollers, 16 and 18, in order to urge these rollers toward one another. Thus, the rollers can accommodate strips of various thickness without the need for adjustments having to be made to the apparatus in the event of setting up the machine tool to accommodate strips of different thicknesses. The rollers 16 and 18 are supported in the same way at both their respective ends as best shown in FIG. 1, similar parts being denoted by similar reference numerals.

The generally rectangular frame 14 also includes an upper channel-shaped member 46 having depending channel leg portions 46a and 46b loosely received or otherwise attached to the leg portions of the upright channel members 28 and 30 associated with the sides of the rectangular frame 14. The flanges 29,29 of channels 28 and 30 are preferably provided with upper edges for supporting the web of the channel 46. Such configuration permits the removal of the upper channel member 46, and the associated oil distributing device to be described, with the result that the apparatus of the present invention can be conveniently cleaned or otherwise repaired with a minimum downtime.

Turning now to a more detailed description of the device for distributing oil in a uniform manner longitudinally of the upper roller 16, said device comprises a coil type tension spring 50 having its convolutions normally adjacent one another. The spring 50 is so mounted in the frame 14 such that it can be stretched in order to provide spaces between the adjacent convolutions in order to drip oil downwardly onto the upper roller 16 located therebeneath at a rate which can be controller to maintain a particular desired rate of flow. The oil may be dripped directly onto the roller or a wick device 12 may be provided to avoid any tendency for a low viscosity oil to splash when dripped directly onto the upper roller 16. Thus, the wick 12 or the roller 16 can be considered to be a lubricant applying means of elongated configuration.

The oil distribution device includes means for bypassing excess oil to the sump 20, and said means for bypassing such oil comprises the passageway defined by the internal cavity within the tension spring 50 such that oil may be continually bypassed to flow through the spring and out through the open left hand end as viewed in FIG. 1, with the result that the excess oil is dumped downwardly into the sump 20 referred to above. Means is provided for supplying oil to the distribution device, and said means includes supply means and a means for feeding oil at a rate which can be varied but which rate will always be in excess of the oil distributed to the upper roller 16.

Still with reference to the oil distribution device associated with the upper roller 16, it will be apparent that the tension spring 50 has its longitudinal axis above and substantially parallel to the axis of rotation of the upper roller 16. The spring 50 is supported at its right hand end by a collar 52 clamped to the spring, and a support rod 54 has an upturned right hand end portion 56 which is nonrotatably received in an opening in said collar 52 and has a threaded end for receiving a nut 58. The rod 54 passes through the interior passageway defined by the spring 50, and has a threaded left hand end portion 55 adapted to receive a nut 60 such that the left hand end portion of the rod can be secured to the channel-shaped support member 46, and more particularly to a depending web 46a provided for this purpose in the channel 46.

Means is provided for stretching the left hand end of the spring so that the clearance between at least some of its convolutions can be increased to thereby increase the rate at which oil is dripped onto the upper roller 16 and hence to the strip S, or workpiece therebelow. Preferably, said spring supporting means comprises the above-mentioned rod 54 and also a spring clamping collar 62, which collar is secured to the left hand end portion of the spring 50, but which collar is slidably received in the fixed frame 14 so as to be movable longitudinally with respect to the rod. It is a feature of the present invention that means is provided for adjustably positioning the movable collar 62 in a predetermined position in order to maintain a desired rate of flow of the oil downwardly onto the upper roller 16.

Preferably, the means for movably or adjustably supporting the collar 62 comprises a lead screw 64 rotatably supported in the depending web 46a and having an end portion threadably received in an opening 62a in the collar 62. In order to prevent rotation of the collar 62, an upwardly projecting pin 62b is provided in the collar 62 and is slidably received in a longitudinally elongated slot 46c provided for this purpose in the upper frame member 46.

The right hand end portion of the oil distribution device communicates directly with an elbow 70 associated with the oil supply means to be described in order to admit oil to the right hand end of the spring 50 such that oil flows through the center portion of the spring and is bypassed in order to provide oil to the sump 20. A desired rate of flow of some of said oil is provided for downwardly through the spring convolutions depending upon the adjustment made by the lead screw 64.

Turning now to a more detailed description of the oil supply means for the distributing device, which device not only distributes oil to the upper roller 16 but also bypasses oil to the sump 20 associated with the lower roll 18, the oil supply means of the present invention includes means for maintaining the level of oil in the sump 20. Said means for maintaining the level of oil in the sump includes a standpipe 72 having its lower end 72a at the desired height for the liquid in the sump, and a closed control chamber 74 having a head space 76 at subatmospheric pressure above the surface of the oil in the chamber, which head space 76 communicates with the upper end 72b of the standpipe 72. Oil is provided to the elbow 70 associated with the right hand end of the distributing device through a short intermediate pipe 78 having its lower end connected directly to the elbow 70 and having its upper end defining a portion of a trap defining structure, the inlet of which trap is arranged inside the control chamber 74 and the outlet of which trap comprises the pipe 78. A second strandpipe 80 is provided with its lower end at a desired oil level in the control chamber, and a conventionally operated vacuum type reservoir means indicated generally at 82 has a connecting line 84 which serves to provide a continuous source of oil to the control chamber 74. The supply means 82 merely comprises an inverted jug of oil, and this jug functions in the manner of the conventional office water cooler. Air is bubbled up through the oil to replace the oil withdrawn through standpipe 84, providing a very simple and uncomplicated source of oil for the control chamber 74. The trap defining structure associated with the control chamber 74 comprises a flow restricting passageway 86 defined by an inverted channel-shaped member 88 associated with the upper end of the pipe 78 such that a relatively small cross sectional area of flow for the viscous oil is provided between the outer wall of the pipe 78 and the downturned right hand flange of the channel member 88. This trap defining structure assures that oil is provided at a sufficient rate to accommodate the oil distributed by the device which includes the tension spring 50, and also that oil is bypassed through the spring to the lower sump 20 in order to maintain the level of fluid in the sump 20 as dictated by the position of the lower end of the standpipe 72.

From the foregoing description it will be apparent that oil can be applied to only the lower surface of the strip simply by adjusting the tension spring 50 to fully closed position for bypassing all oil and feeding such oil to the sump 20. Not quite so apparent is the fact that oil can also be provided to only the upper surface of the strip S. Some oil would have to be continually bled from the sump 20, in order to accomplish this result, but merely providing a controllable leak in the sump would permit this result to be quite readily achieved. In such a system one might also want to provide a back-up roller for the underside of the sheet against which the upper roller 16 could act.

The upper roller, or lubricant applying means 16 may receive oil directly from the opening between the convolutions of the tension spring 50, or the wick device 12 provided with one end encircling the spring and the other end tangentially engaging the roller 16 to reduce splashing of the oil. The wick device 12 could be employed without the roller 16 to apply oil directly to the workpiece or strip S within the scope of the present invention.

We claim:

1. A system for distributing oil to at least the upper surface of a continuously moving strip of material said system comprising:
   an oil applicator associated with the upper surface of the strip to be oiled,
   said applicator including a device for distributing oil transversely of the strip, said device having a tension spring with its longitudinal axis oriented transversely of the strip
   oil supply means for said oil distributing device, and including means for feeding oil to said device at a rate which is always in excess of the oil to be applied to the upper surface of the strip,
   oil bypass means comprising the interior of said tension spring one end of said spring receiving oil from said supply means,
   a sump for the excess oil, and said spring having an end opposite said one end for depositing the excess oil reaching said opposite end into said sump,
   means for exerting a desired tension on said spring to spread its convolutions and drip oil downwardly in a uniform manner transversely of the strip at a rate which is adjustable, and
   means responsive to the level of the oil in said sump for controlling the rate of flow from said oil supply means.

2. The system according to claim 1 and adapted to provide oil to the lower surface of the strip, said system further characterized by a lower roller engagable by the lower surface of said strip and rotated thereby, said lower roller being so arranged with respect to said sump and to the level of oil therein as to pick up oil therefrom for transfer to the lower surface of said strip.

3. The system according to claim 1 wherein said means responsive to the level of oil in said sump comprises a standpipe having its lower end at a predetermined height in said sump, and a closed control chamber having a supply of oil therein and having a head space at subatmospheric pressure above the surface of said oil supply and communicating with the upper end of said standpipe.

4. The system according to claim 3 wherein said means for feeding oil comprises a trap defining structure having an inlet inside said control chamber and an outlet communicating with said distributing device, and said oil supply means further including a second standpipe having its lower end set at a desired oil level in said control chamber, and vacuum operated reservoir means for gravity feeding oil through said second standpipe to maintain the desired oil level in said control chamber.

5. The system according to claim 1 wherein said oil applicator associated with the upper surface of the strip to be oiled further comprises an upper roller engageable by the strip upper surface and rotated thereby and disposed intermediate said spring and the strip.

6. The system according to claim 1 wherein said oil applicator associated with the upper surface of the strip to be oiled comprises an elongaged wick having its axis oriented parallel that of said spring.

7. The system according to claim 6 wherein said oil applicator associated with the upper surface of the strip to be oiled further comprises an upper roller engageable by the strip upper surface and rotated thereby and disposed intermediate said spring and the strip.

8. The system according to claim 1 wherein said means for adjustably tensioning said spring comprises a rod extending longitudinally through said spring, and spring clamping collar means at each end of said spring, one of said collar means being fixed to one end of said rod and the other collar means being movable longitudinally with respect to said rod, and means for adjustably positioning said movable collar in a predetermined position.

9. The system according to claim 8 wherein said applicator associated with the upper surface of the strip comprises an upper roller engageable by the strip upper surface and rotated thereby and disposed intermediate said spring and the strip.--

10. The system according to claim 8 and adapted to provide oil to the lower surface of the strip, said system further characterized by a lower roller engagable by the lower surface of said strip and rotated thereby, said lower roller being so arranged with respect to said sump and to the level of oil therein as to pick up oil therefrom for transfer to the lower surface of said strip.

11. the system according to claim 9 wherein said means responsive to the level of oil in said sump comprises a standpipe having its lower end at a predetermined height in said sump, and a closed control chamber having a supply of oil therein and having a head space at subatmospheric pressure above the surface of said oil supply and communicating with the upper end of said standpipe.

12. The system according to claim 11 wherein said means for feeding oil comprises a trap defining structure having an inlet inside said control chamber and an outlet communicating with said distributing device, and said oil supply means further including a second standpipe having its lower end set at a desired oil level in said control chamber, and vacuum-operated reservoir means for gravity feeding oil through said second standpipe to maintain the desired oil level in said control chamber.

* * * * *

UNITED STATES PATENT OFFICE
CERTIFICATE OF CORRECTION

Patent No. 4,033,289                     Dated   July 5, 1977

Inventor(s)  Herbert E. Taylor and Frederick P. Evans

It is certified that error appears in the above-identified patent and that said Letters Patent are hereby corrected as shown below:

Col. 1, lines 66-67, "DETAILED DESCRIPTION" should be centered over Col. 2.

Col. 6, line 36, after "and the strip." delete "--".

Col. 6, line 44, "the" should be --The--.

Col. 6, line 44, "9" should be --8--.

Signed and Sealed this

Twenty-seventh Day of September 1977

[SEAL]

Attest:

RUTH C. MASON  
Attesting Officer

LUTRELLE F. PARKER  
Acting Commissioner of Patents and Trademarks